(12) United States Patent
Landis et al.

(10) Patent No.: US 6,371,435 B1
(45) Date of Patent: Apr. 16, 2002

(54) MOUNTING SYSTEM FOR MOUNTING MODULES TO A RAIL

(75) Inventors: John M. Landis, Camp Hill; David J. Fabian, Mt. Joy, both of PA (US); Rudolf Kraemer, Lautertal; Christian Schrettlinger, Bensheim, both of (DE); Douglas A. Lostoski, Richfield, OH (US)

(73) Assignee: The Whitaker Corporation, Wilmington, DE (US)

( * ) Notice: Subject to any disclaimer, the term of this patent is extended or adjusted under 35 U.S.C. 154(b) by 0 days.

(21) Appl. No.: 09/549,006

(22) Filed: Apr. 14, 2000

Related U.S. Application Data
(60) Provisional application No. 60/129,178, filed on Apr. 14, 1999.

(51) Int. Cl.[7] .......................... F16M 11/00; H01R 4/66; H05K 7/14; H02B 1/052
(52) U.S. Cl. .................. 248/694; 439/716; 439/717
(58) Field of Search ................. 248/226.12, 227.1, 248/228.3, 228.5, 231.21, 231.41, 231.61, 694; 439/717, 716

(56) References Cited

U.S. PATENT DOCUMENTS

| | | | | |
|---|---|---|---|---|
| RE25,442 E | * | 9/1963 | Blanchet .................... | 439/716 |
| 4,269,471 A | * | 5/1981 | Woertz ....................... | 439/94 |
| 4,437,721 A | * | 3/1984 | Kollmann et al. .......... | 439/397 |
| 4,454,382 A | * | 6/1984 | Borne et al. ............. | 174/158 R |
| 4,776,815 A | * | 10/1988 | Baillet et al. ................ | 439/724 |
| 5,022,863 A | * | 6/1991 | Keens et al. ................ | 439/108 |
| 5,135,415 A | * | 8/1992 | Huber ........................ | 439/716 |
| 5,174,767 A | * | 12/1992 | Diekmann et al. ............ | 439/94 |
| 5,775,955 A | | 7/1998 | Graube et al. .............. | 439/717 |
| 5,835,304 A | * | 11/1998 | Landreau et al. ........... | 439/721 |
| 5,842,889 A | * | 12/1998 | Kollmann ................... | 439/716 |
| 5,928,008 A | * | 7/1999 | Munshi ....................... | 439/94 |

FOREIGN PATENT DOCUMENTS

| | | | |
|---|---|---|---|
| DE | WO97/10692 | | 3/1997 |
| DE | 196 44 416 | * | 11/1997 |
| DE | 197 09 811 A1 | | 9/1998 |
| EP | 0437 124 A1 | * | 11/1990 |
| GB | 2277201 | * | 10/1994 |

* cited by examiner

*Primary Examiner*—Anita King

(57) ABSTRACT

A mounting system for electrical modules (10) having a housing (12) with a rail mounting face (14) including a rail receiving recess (17), includes a pair of spring loaded rail engaging clamps (80) disposed on the mounting face (14) and movable between a first or latched position and a second or open position. Each clamp (80) includes a body portion (85) having a spring receiving cavity (85a), a base (82) extending outwardly from a lower edge of the body portion in one direction and a rail engaging arm (88) extending outwardly from an upper edge of the body portion and in a direction opposite to the base. The body portion (85) includes a wall (86) extending at an angle from the base to the arm and defining a rail latching surface (86a). A partially compressed spring disposed (90) in the cavity (85a) exerts a selected force to hold the clamps (80) in the latched position.

8 Claims, 14 Drawing Sheets fig. 4

MOUNTING SYSTEM FOR MOUNTING MODULES TO A RAIL

This application claims benefit of Provisional Application 60/129,178 filed Apr. 14, 1999.

This invention relates to a mounting system for mounting electrical modules to a rail in a stacked arrangement.

It is well known in the art to use a plurality of electrical input/output modules that fit together in a stacked arrangement and are electrically connected together. It is also known that the modules may be mounted to a U-shaped metal rail that supports the device and provides electrical connection to ground.

U.S. Pat. No. 5,775,955 discloses one such arrangement in which each module has plug-compatible male and female connectors that are electrically engaged by sliding a loose module along a rail and into engagement with modules that are fixed to the rail. The modules are secured to the rail by two manually operated slidable tabs that slide through slots in the housing to engage lateral portions of the rail. To repair or replace a selected module in the stacked arrangement, it is necessary to release the slidable tabs for all the modules to one side of the selected module, then slide and remove all the released modules from the rail before the selected module can be removed, repaired or replaced. The whole process is then repeated to remount all the modules. This process can cause excessive wear on components that may engage the rail as well as take time. It is desirable, therefore, to have a module that can be removed and remounted to a rail without disturbing the other modules on the rail.

U.S. Pat. No. 5,842,889 discloses a module having an unlocking device for a locking fasteners on sides of a rail receiving portion of a module. The device includes a dielectric bracing piece integral with each of the locking fasteners and extending toward the middle of the underside of the module. The inner ends of the bracing pieces are secured to a rod that extends upwardly through the module. The locking feet or clamps on the underside of the module are opened by activating a rod that presses locking feet out of engagement with the rail.

International Patent Application Publication No. WO 97/10692 discloses modules that are mounted to a rail by engaging a first edge of the rail with a lip on one side of a rail receiving recess of the module, pivoting the module about an axis in a direction substantially parallel to the stacking direction and engaging a resilient latch to the other edge of the rail. The module may be removed by prying open the latch and pivoting in the opposite direction.

It is an object of the present invention to provide a spring loaded clamp for a module that automatically secures the module to the rail upon mounting the module in a direction vertical to the longitudinal axis of the rail.

It is a further object to provide a device that can be readily operated to enable removal of the module from the rail in a vertical direction.

SUMMARY OF THE INVENTION

The present invention is directed to mounting clamps for mounting modules to a rail that overcomes the problems associated with the prior art. At least two clamps are used for each module. The clamps are spring loaded and can be activated by mounting the module to the rail in a vertical direction without the use of tools. The module includes an actuator that can be operated with a simple tool to effect release of the clamps and removal of the module from the rail. It is to be understood that more than one pair of clamps may be used with a wide module.

A mounting system for electrical modules having a housing with a rail mounting face including a rail receiving recess, and a plurality of electrical terminals disposed therein for electrical engagement with complementary terminals of an adjacent module when in a stacked arrangement. The mounting system includes a pair of spring loaded mounting clamps disposed on the mounting face and movable between a first or latched position and a second or open position. Each clamp includes a body portion having a spring receiving cavity, a base extending outwardly from a lower edge of the body portion in one direction and a rail engaging arm extending outwardly from an upper edge of the body portion and in a direction opposite to the base. The body portion includes a wall extending at an angle from the base to the arm and defining a rail latching surface proximate the arm. The base and arm are movably mounted along respective tracks between the latched and opened positions. A partially compressed spring is disposed in the cavity such that the clamps are normally in the latched position.

The clamps can be moved from the latched to the open position by engagement with the upper surface of a rail whereby the rail moves along the angled walls, acting as a camming surface to exert force against the walls such that the spring compresses until the respective latching surfaces are moved out of the rail receiving recess and the rail engages the rail mounting surface of the housing. Upon the module being fully mounted to the rail force against the walls ceases and the spring expands moving the latching surfaces into engagement under edges of the rail.

The invention further includes a device for opening the clamps and releasing the module from the rail, the device being an actuator defining a camming surface that engages a leading end of both of the clamps such that upon rotating the actuator from a first orientation to a second orientation, force is exerted on the arm ends to cam the arms to the open position thereby permitting removal of the module from the rail. The module may also be mounted to the rail in the open position and the actuator rotated to secure the module to the rail.

An embodiment of the invention will now be described by way of example with reference to the accompanying drawings.

BRIEF DESCRIPTION OF THE DRAWINGS

FIG. 3 is an isometric view of a latching arm of the present invention.

FIG. 8 is a cross-sectional fragmentary view of lower housing illustrating the latching arms and actuator.

FIG. 13 is an isometric view of the module of FIG. 11 illustrating the position of the top of the actuator when the module is being released from a rail.

DETAILED DESCRIPTION OF THE INVENTION

Figure 1:
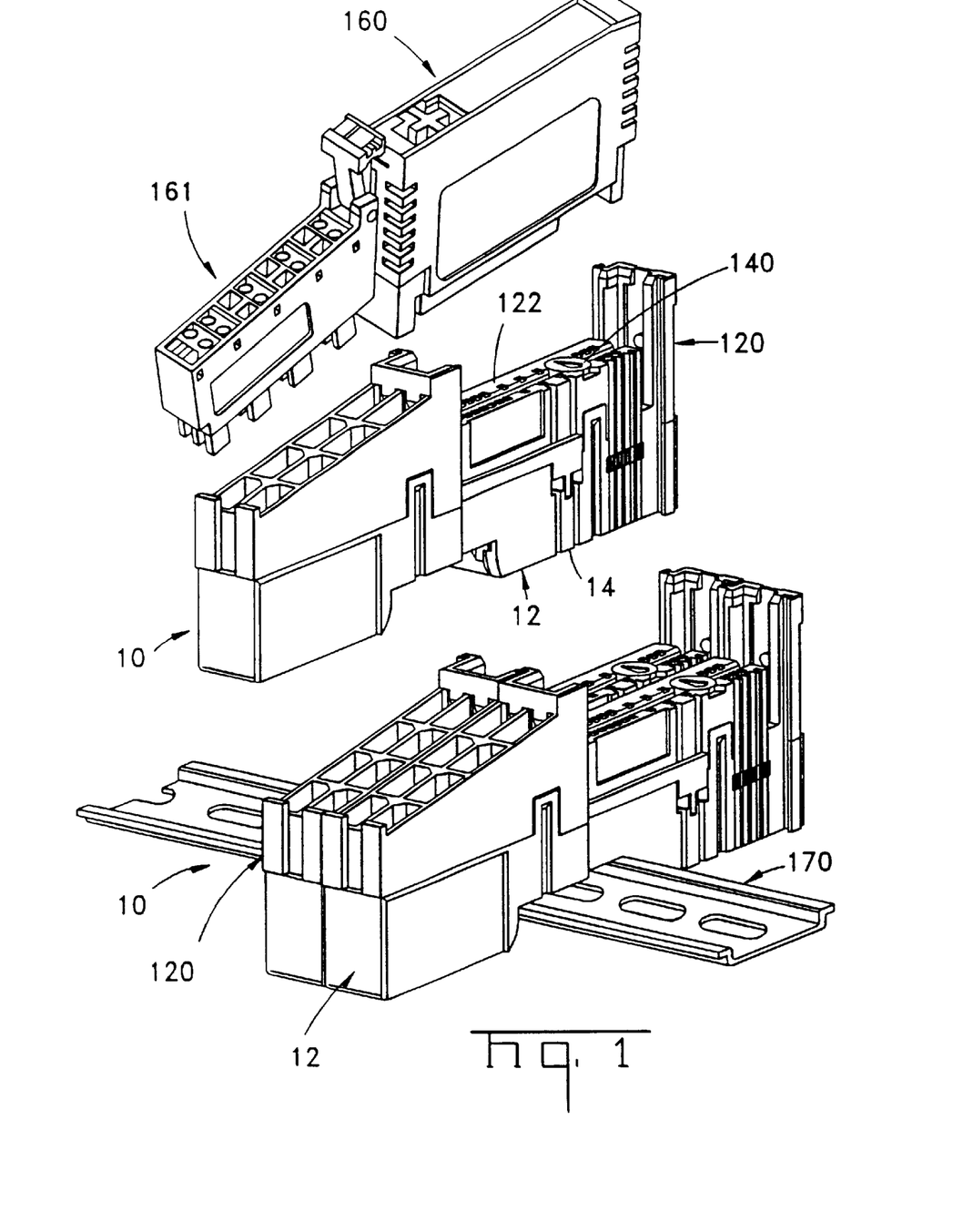
FIG. 1 is an isometric partially exploded view of an electrical system using the modular connector assembly of the present invention and illustrating two complementary mating connectors for one of the modules.

In FIG. 1 two modules, each identified as a connector assembly 10 of the present invention, are shown mounted to a rail 170 of an electrical device. A third connector assembly 10 is shown exploded from the rail 170. Two complementary mating connectors 160, 161 are exploded from the third assembly 10.

Figure 2:
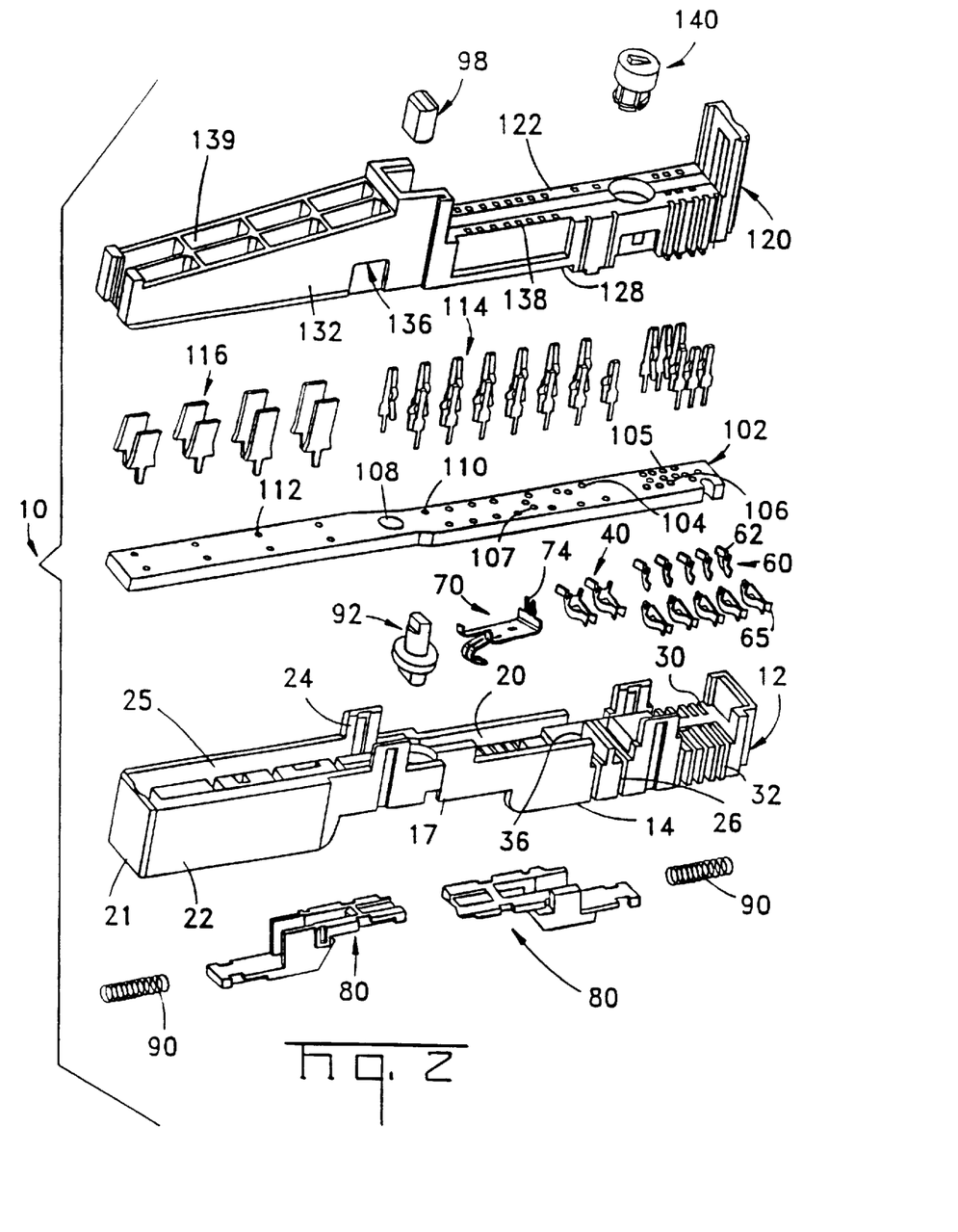
FIG. 2 is an isometric exploded view of one of the connector assembly modules of FIG. 1.

Referring now, to FIGS. 1 and 2, connector assembly 10 includes a lower housing 12 having a plurality of terminals 40, 60 and 70 disposed therein; an upper housing 120 securable to the lower housing 12 and having a plurality of terminals 114, 116 disposed therein and a circuit board 102 disposed between and within the housings 12, 120. Lower housing 12 has a rail mounting face 14 including rail engaging recess 17, an assembly face 20, end walls 21, and side walls 22 having latch arms 24 extending upwardly therefrom and adapted to engage cooperating latch surfaces 136 on upper housing 120. End walls 21 and side walls 22 and assembly face 20 together defme a circuit board receiving cavity 25 adapted to receive circuit board 102 therein. Housing 12 includes power terminal receiving passageways 26, data contact receiving cavities 30, 32 and ground terminal receiving cavity 36 for receiving respective power terminals 40, data terminal portions 62, 65, and ground terminal 70. Lower housing 12 further includes spring loaded rail engaging clamps 80 mounted to rail mounting face 14. Clamps 80 cooperate with springs 90 to hold connector assembly 10 on the rail 170, assembly 10 being released from the rail 170 by turning an actuator having lower portion 92 and upper portion 98, as more fully described below. Upper housing 120 has a mating face 122, an assembly face 128 and opposed side walls 132 having latch surfaces 136 adapted to receive latch arms 24 to hold the two housings 12, 120 together. Housing 120 further includes terminal receiving cavities 138 and 139 for receiving respective terminals 114 and 116 therein. Upper housing 120 further includes the upper portion 98 of the actuator and a programmable key-receiving member 140 that cooperates with a key protrusion (not shown) on mating housing 160. Further details about the operation of the key-receiving member are found in co-pending U.S. patent application Ser. No. 09/549,639, filed concomitantly herewith and incorporated by reference herein.

As can best be seen in FIG. 2, power terminals 40, data terminals 60 including blade sections 62 and compliant arm sections 65, and ground terminal 70 are adapted to be mounted to one side of circuit board 102 and terminals 114 and 116 are adapted to be mounted to the other side of circuit board 102. The terminals may be mounted using compliant sections or solder tails that are received in apertures of board 102 to be electrically connected to circuits of the board. It is to be understood that the terminals may also be surface mounted to board 102 by means known in the art.

Figure 4:
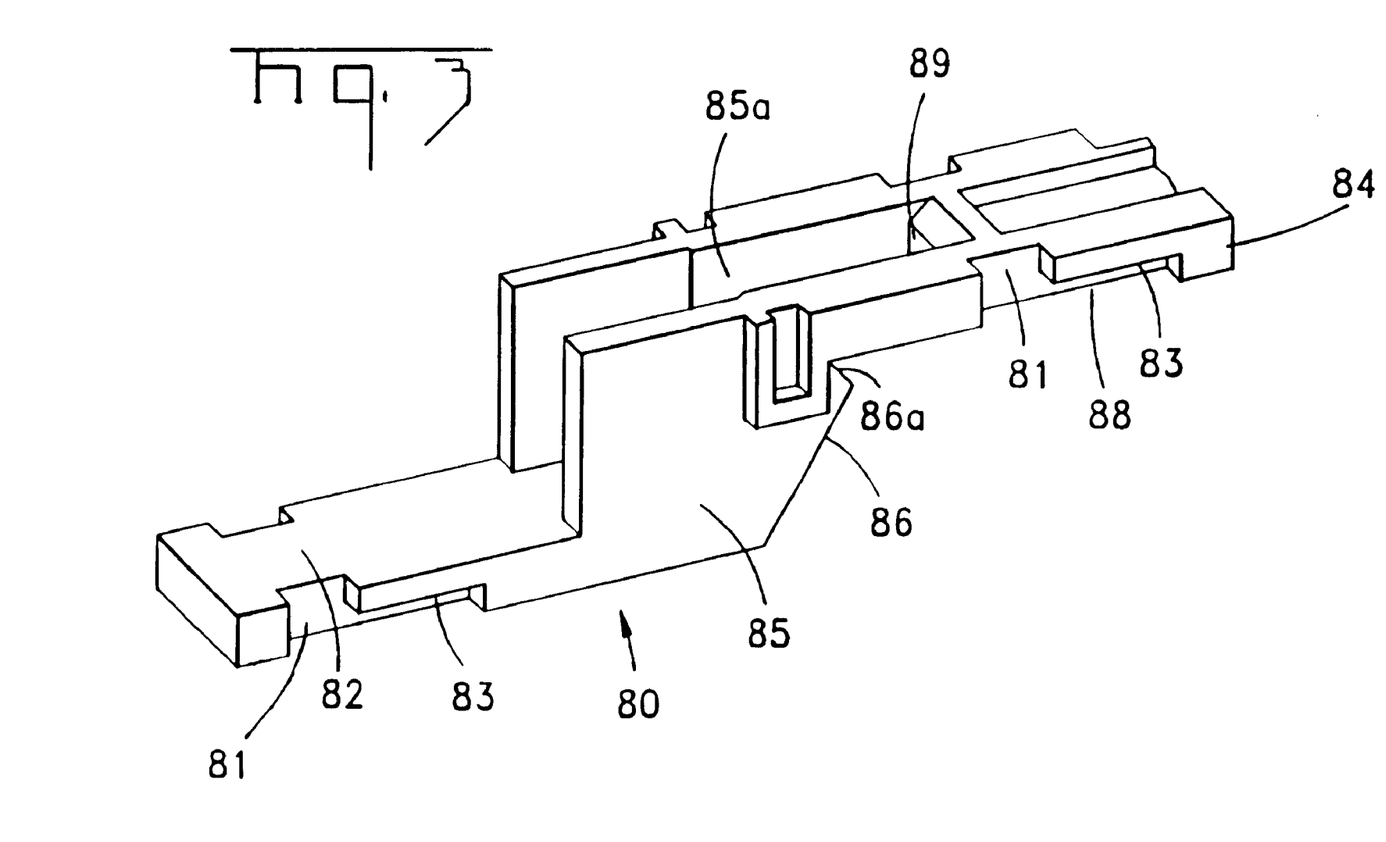
FIG. 4 is an isometric view illustrating two modular connector assemblies mounted to a rail and a third assembly exploded therefrom.
Figure 5:
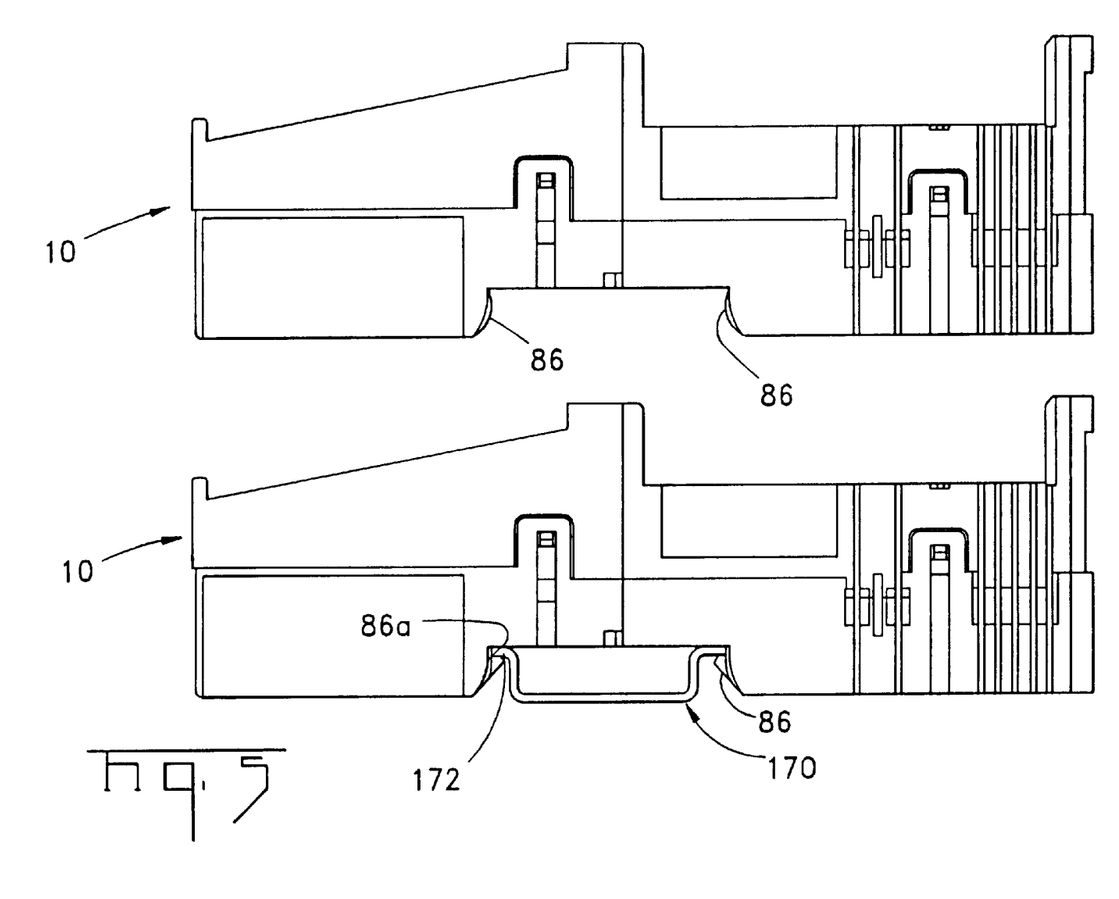
FIG. 5 is a plan view of one module connector assembly mounted to the rail and a second assembly exploded therefrom.
Figure 6:
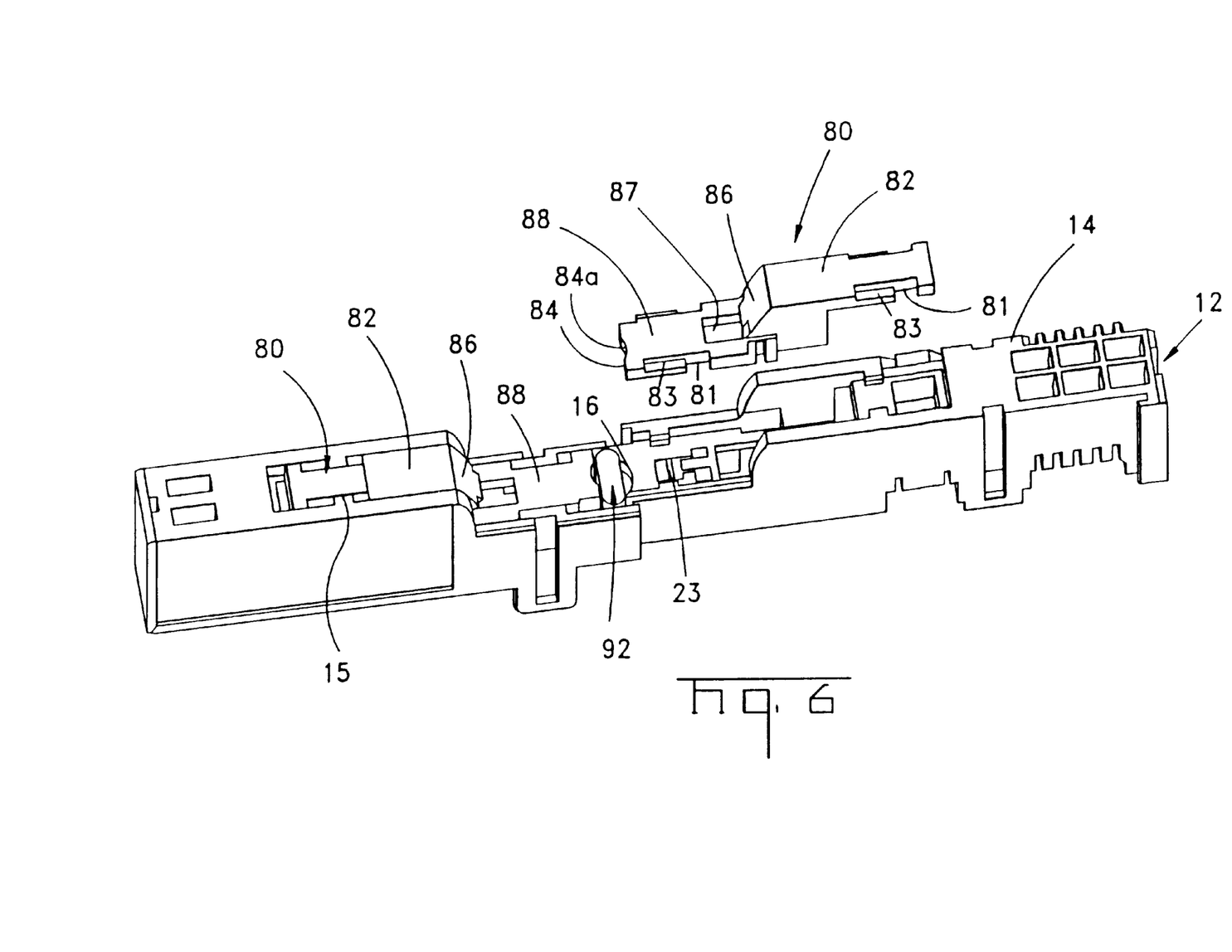
FIG. 6 is an isometric view of the lower connector housing of the module with one of the latching arms exploded from the housing.
Figure 10:
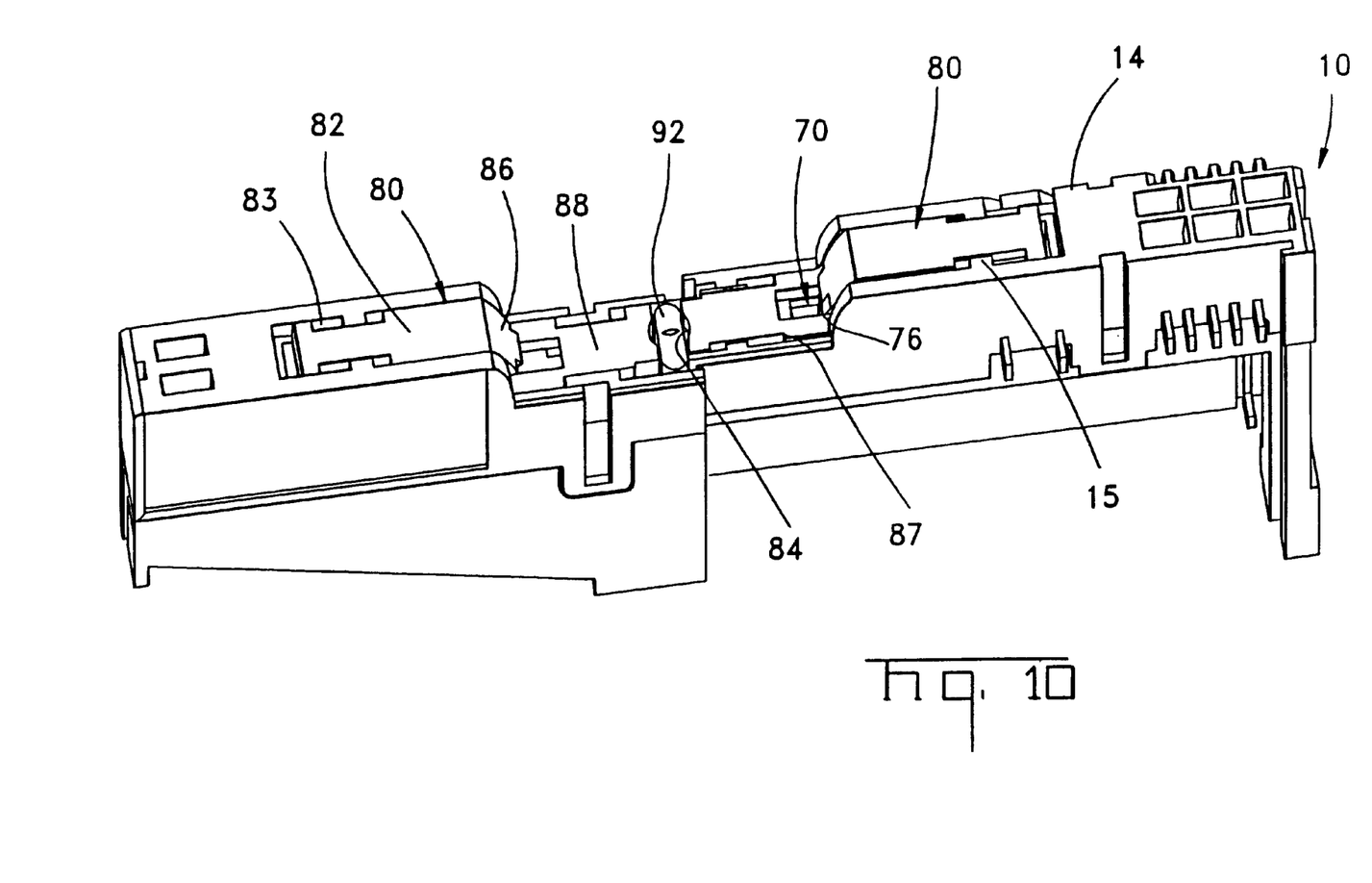
FIG. 10 is an isometric view of the assembled connector assembly module illustrating the position of the latching arms, actuator and ground contact when the module is mounted to a rail.

Referring now to FIGS. 3 through 8, each rail engaging clamp 80 includes a box-like body portion 85 defining a spring receiving cavity 85a, a base 82 extending outwardly from body portion 85 along a lower edge thereof and a rail engaging arm extending outwardly from body portion 85 from an upper edge thereof to actuator engaging surfaces 84 and 84a. The base and rail engaging arm 82, 88 extend in opposite directions from body portion 85. Rail engaging arm 88 also includes aperture 87 adapted to receive a portion of ground contact 70 therethrough to provide electrical connection to ground upon mounting module 10 to rail 170, as best seen in FIGS. 6, 10, and 14.

Base 82 and rail engaging arm 88 include respective notches 81 extending a selected distance into the sides thereof, the notches 81 being in communication with elongate grooves 83. Notches 81 and grooves 83 are configured to cooperate with portions 15 on rail mounting face 14 to secure rail engaging clamps 80 to connector housing 12, as more fully explained below. An outer wall 86 of body portion 85 extends at an angle from base 82 to rail engaging arm 88 and defines a latching surface 86a at the upper end thereof proximate rail engaging arm 88. Latching surfaces 86a engage edge 172 of rail 170 when connector assembly module 10 is mounted thereto, as shown in FIGS. 4 and 5.

Figure 7:
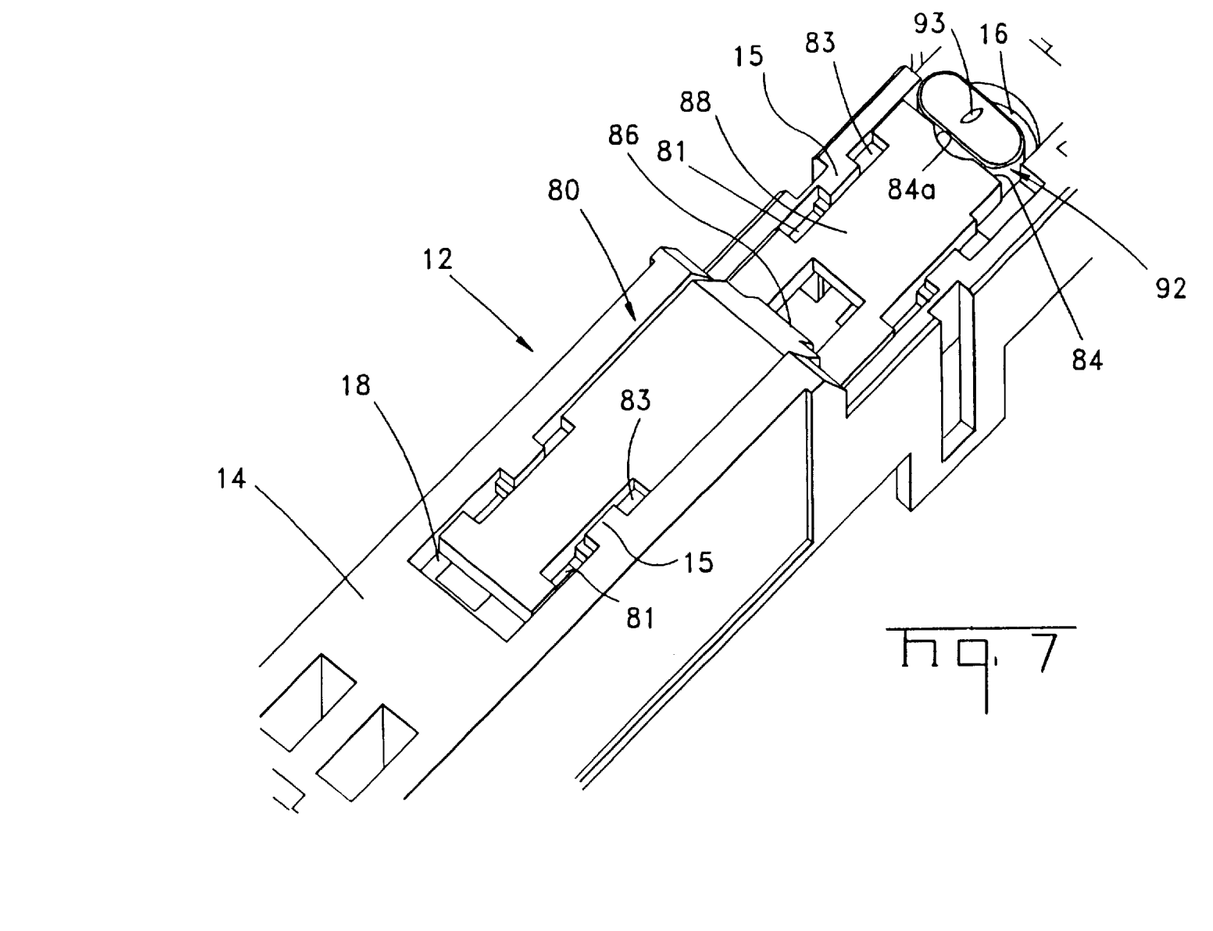
FIG. 7 is an enlarged fragmentary portion of FIG. 6.

FIGS. 6 through 8 illustrate the assembly of rail engaging clamps 80 to rail engaging face 14 of housing 12. Face 14 includes a clamp engaging latch 23 on each side of actuator receiving aperture 16, only one of which is shown in FIGS. 6 and 8. Clamps 80 are positioned over face 14 such that projections 15 on face 14 are received in corresponding notches 81, thereby allowing the clamps 80 to be disposed in respective clamp receiving tracks 18. Clamps 80 are moved toward each other in the respective tracks such that projections 15 are moved into grooves 83 and latch arm 23 engages latching surface 89 (shown in FIG. 3) of clamp 80 as shown in FIG. 8. FIG. 8 further shows the position of lower actuator portion 92 disposed in actuator receiving aperture 16 of housing 12. Actuator portion 92 includes elliptical base 94, flange 95 and upwardly extending rod portion 96 extending to end 97 adapted to be received in top aperture portion 98, shown in FIG. 2. For purposes of illustration, ground contact 70 and springs 90 have not been shown in FIG. 8. The leading ends 84 of rail engaging arm 88 engage the longer side surfaces of elliptical actuator base 94 when clamps 80 are in the first or latched position, as shown in FIG. 7. FIG. 7 also illustrates an optional tool receiving slot 93 in base 94 for rotating the actuator between two positions, as discussed below.

Figure 9:
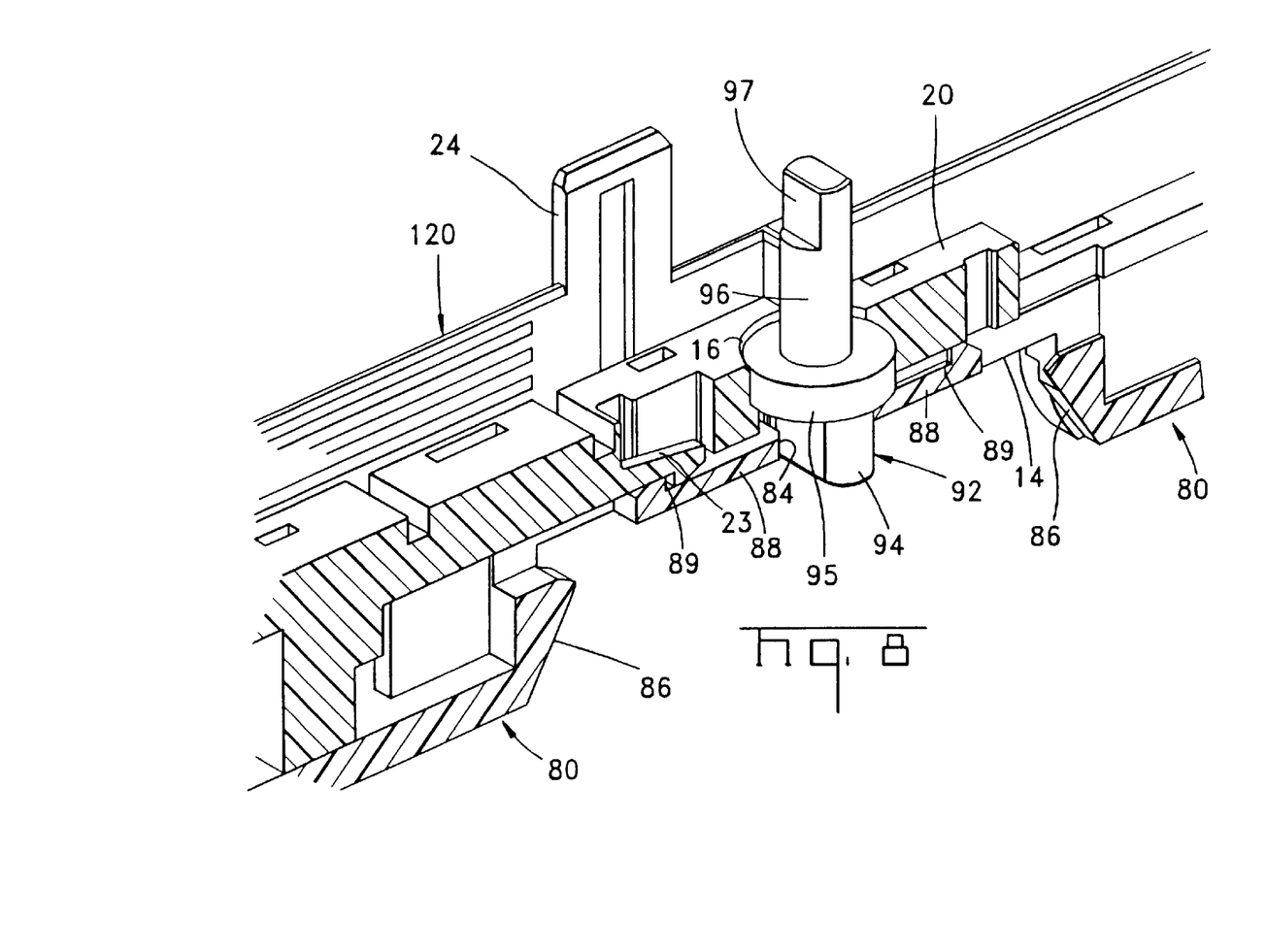
FIG. 9 is an isometric view of the ground contact of the present invention.
Figure 14:
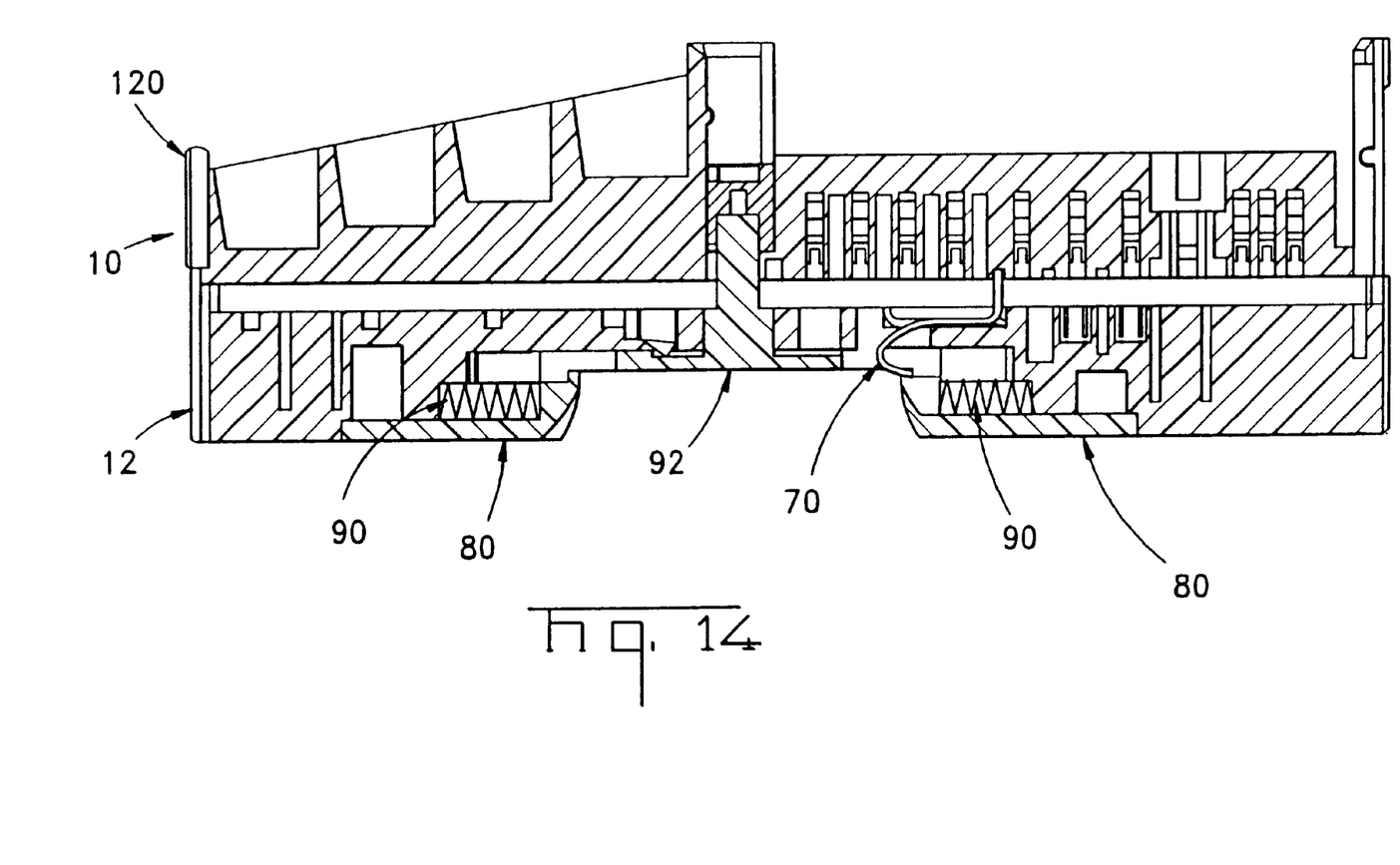
FIG. 14 is a cross-sectional view of the module of FIGS. 12 and 13.
Figure 17:
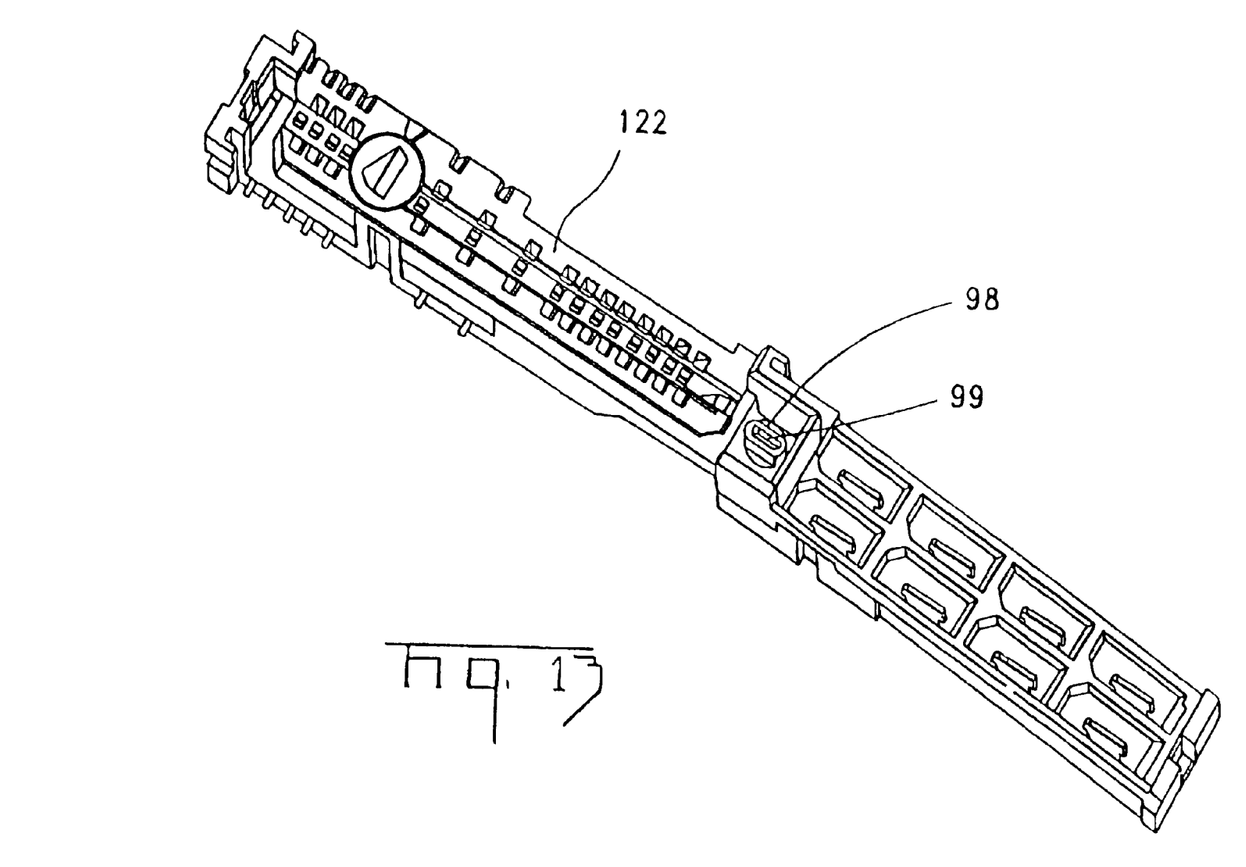

Ground contact 70, shown in FIG. 9 includes a body 72, having a pair of terminals 74 at one end adapted to be electrically connected to circuit board 102 shown in FIG. 2 and an oppositely directed spring contact 76 at the other end adapted to engage rail 170 and be held in electrical engagement therewith by rail engaging clamps 80 when module 10 is latched to rail 170, as shown in FIG. 14. Body 72, in the embodiment shown, also includes retention portions for positioning contact 70 in housing 12, as best seen in FIG. 4.

Referring again to FIG. 2, one method of assembling connector assembly module 10 is to first dispose terminals 114 and 116 in respective cavities 138, 139 of upper housing 120. A circuit board subassembly can then be assembled by mounting the ground terminal 70, power terminals 40 and data terminals 60 in respective apertures 107, 104, 105 and 106 on the under side of circuit board 102. The upper side of the circuit board subassembly can then be disposed on the board mounting sections of terminals 114 and 116. Terminals 114, 116 are mounted in apertures 110, 112, respectively. The lower housing 12 having springs 90, rail engaging clamps 80 and lower actuator portion 92 disposed therein can then be secured to the upper housing and board subassembly. In the assembled connector lower actuator portion 92 extends through opening 108 of circuit board 102 and into the upper housing 120. Lastly, the upper actuator portion 98 and the key receiving member 140 are inserted into respective apertures in the upper housing 132.

FIGS. 10 through 14 illustrate the positions of the rail engaging clamps 80 and actuator portions 92, 98 when module 10 is mounted to a rail and when module 10 is being removed from the rail. These Figures also include spring arm 76 of ground contact 70 exposed in aperture 87 of rail engaging clamp 80. As previously discussed owing to the structure of the terminals used in the invention, module 10 is mounted to the rail in a vertical direction with respect to the rail. When rail engaging clamps 80 are in the latched position, there is a selected amount of force exerted by the springs to retain the clamps in a first or latched position with the actuator portions 92 and 98 in the respective positions shown in FIGS. 10 and 11. Module 10 can be mounted to the rail 170 by moving the module downwardly until the angled walls 86 engage rail edges 172. By applying additional downward force to the module, the rail edges are moved upwardly along the angled wall 86 and act as camming surfaces to move the walls 86 and clamps 80 rearwardly along the tracks 18 to a second or open position, compressing springs 90 until the rail edges 172 to engage the rail mounting face 14, at which time springs 90 return clamps 80 to their original position and latches 86a are brought into engagement with the underside of rail edges 172.

Figure 11:
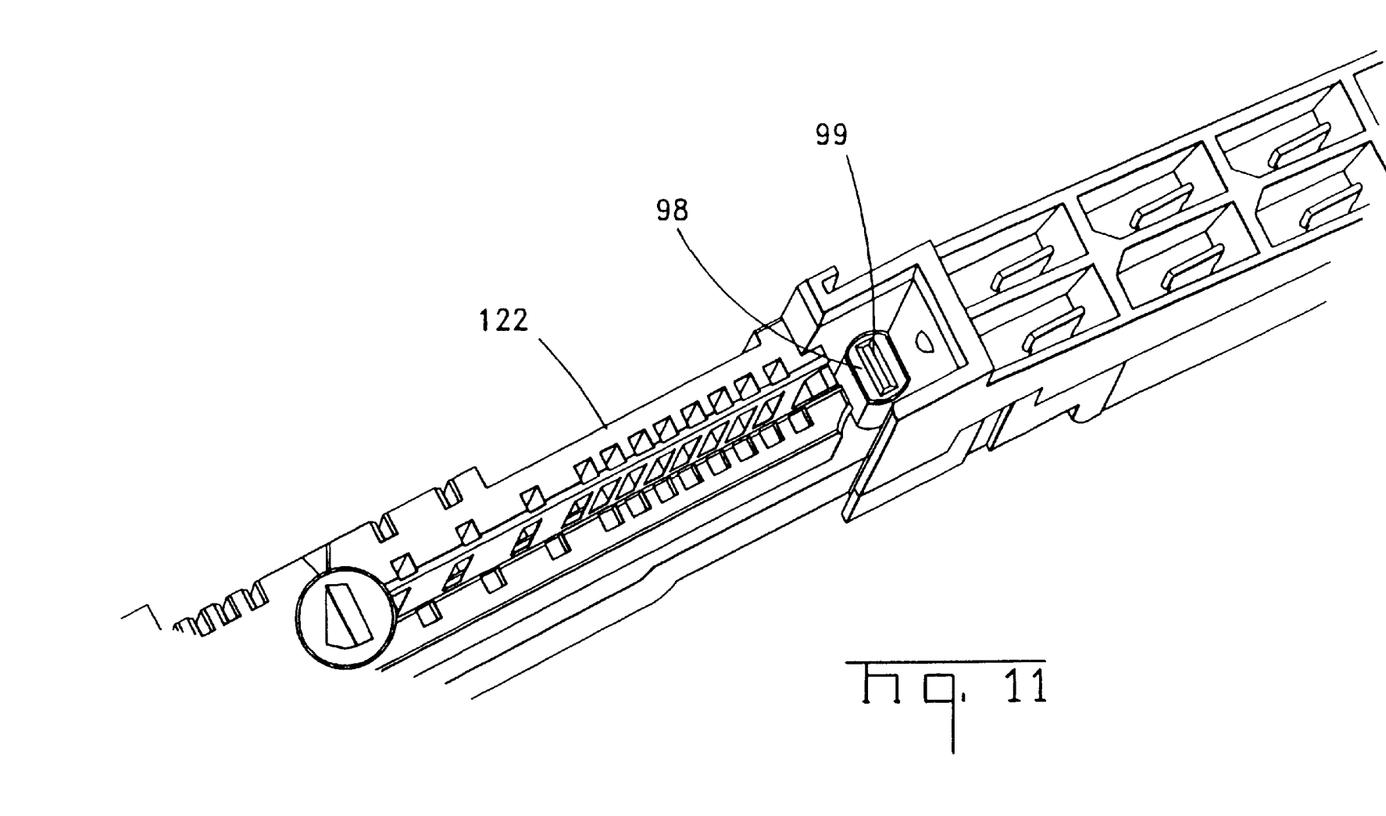
FIG. 11 is an isometric fragmentary view of the module of FIG. 10 as viewed from the upper connector of the assembly illustrating the position of the top of the actuator when the module is mounted to a rail.
Figure 12:
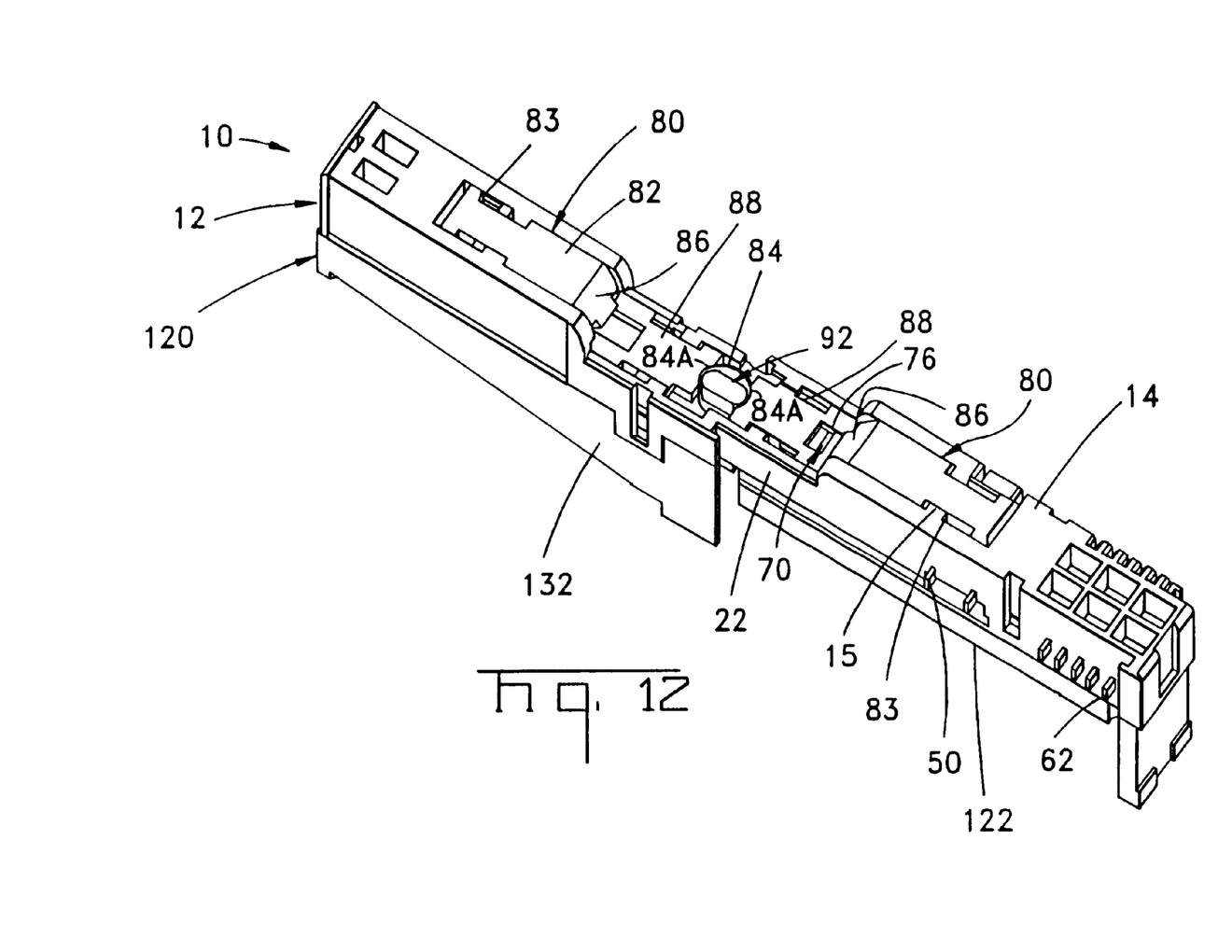
FIG. 12 is a view similar to that of FIG. 10 illustrating the position of the latching arms, actuator and ground contact when the module is being released from a rail.

FIGS. 12, 13, and 14 illustrate the procedure for moving the actuator and clamps 80 to the second or open position for removing a module 10 from rail 170. Upper actuator portion 98 is adapted to be engaged by a tool, camming surfaces of a mating connector or other device to rotate the upper portion from one position to the other. FIGS. 10 through 12 illustrate one example shown as a slot 99 that is adapted to receive an end of a screw driver or the like. Upon turning the actuator portions 92, 98 to the positions shown in these Figures wherein the longer axis of elliptical base 94 extends between arm ends 84, and engage detents 84a, the clamps 80 are cammed to the open position. When the shorter sides or ends of elliptical actuator base 94 engage detents 84a, there is an audible sound. In addition the tool operator can feel when engagement occurs. The latch surfaces 86a are thereby released from rail edges 172 such that the module 10 may be lifted vertically from the rail 170.

Alternatively module 10 can also be mounted to rail 170 by first moving the clamps to the open position (illustrated in FIG. 4) with actuator base 94 engaged in detents 84a, moving the module into engagement with rail 170 and then rotating actuator portion 96 to move the clamps 80 to the latched position. Mating connectors, such as connectors 160 may be polarized at the mating face to preclude mating with module 10 if clamps 80 are not latched to the rail.

The pair of rail engaging clamps of the present invention enable a module to be mounted and removed from a rail in a vertical direction. The rail engaging clamps cooperate with the ground spring to provide sufficient contact force between the spring and the rail. The actuator is easily rotated by a tool or other camming surface and requires a minimum amount of space to operate, thus minimizing the space required for placement of additional modular devices mounted to other rails.

It is thought that the rail mounting clamp and the release actuator of the present invention and many of the attendant advantages will be understood from the foregoing description. It is apparent that various changes may be made in the form, construction, and arrangement of parts thereof without departing from the spirit or scope of the invention, or sacrificing all of its material advantages.

What is claimed is:

1. A mounting system for an electrical module the module including a housing having a mounting face, the mounting system comprising:

a pair of spring loaded mounting clamps, each clamp including:
      a body portion having a spring receiving cavity;
      a base extending outwardly from a lower edge of said body portion and adapted to be received and moved in a clamp receiving track extending along said mounting face from a first position to a second position; and
      a rail engaging arm extending outwardly from an upper edge of said body portion and in a direction opposite to said base, said arm being adapted to be received and moved in the clamp receiving track along a rail receiving recess from said first position to said second position;
      said body portion including a wall extending at an angle from said base to said arm and defining a rail latching surface proximate said arm, said latching surface being movable from said first position wherein said latching surface extends into said rail receiving recess for engagement with a rail and said second position wherein said latching surface is retracted from said recess;
      whereby upon disposing a spring having a selected amount of compression in said cavity of each body portion and mounting said clamps to said mounting face with said base and arm of each clamp within said track, each said clamp is biased by said spring to said first position.

2. The mounting system of claim 1 wherein the angularly extending walls of said body portion further define a camming surface such that as the module is mounted to the rail in a direction substantially vertical to a long axis of said rail, edges of said rail cam said mounting clamps to said second position until said module is fully seated whereby said springs bias the clamps to said first position thereby securing said module to said rail.

3. The mounting system of claim 1 wherein said housing further includes an actuator movable between first and second orientations to cam said mounting clamps between the first and second positions.

4. The mounting system of claim 3 wherein said actuator includes an elliptically shaped body that cooperates with leading ends of said rail engaging arms to move said clamps between said first and second positions.

5. The mounting system of claim 4 wherein surfaces along ends of a longer axis of the elliptical body are received in cooperating recesses at said leading ends of said rail engaging arms to hold the clamps in the second position thereby facilitating mounting of and removal of said module from said rail.

6. The mounting system of claim 3 wherein said actuator extends to an upper surface of said module such that said actuator is accessible for actuation, thereby permitting said module to be easily mounted to and removed from the rail.

7. The mounting system of claim 6 wherein said actuator includes a tool engaging slot exposed at said upper surface of said module.

8. The mounting system of claim 1 wherein said rail engaging arm further includes an aperture extending therethrough adapted to receive a portion of a ground terminal of said module such that said ground terminal is engaged with said rail when said module is mounted thereto.

* * * * *